United States Patent
Crawford et al.

(10) Patent No.: US 7,410,575 B1
(45) Date of Patent: Aug. 12, 2008

(54) FLUID FILTER AND CAP MEMBER (75) Inventors: Brian Scott Crawford, Bessemer City, NC (US); Michael David Adams, Bessemer City, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 252 days.

(21) Appl. No.: 10/445,054

(22) Filed: May 27, 2003

(51) Int. Cl.
  *B01D 35/00*  (2006.01)
  *B01D 35/147* (2006.01)
  *B01D 35/30*  (2006.01)

(52) U.S. Cl. .............. 210/232; 210/130; 210/435; 210/443; 210/444; 210/450; 210/451; 210/493.1; 210/493.3

(58) Field of Classification Search ........... 210/435, 210/443, 232, 130, 450, 451, 444, 499, 493.1, 210/493.3, DIG. 17
See application file for complete search history.

(56) References Cited

U.S. PATENT DOCUMENTS

| | | | |
|---|---|---|---|
| 1,195,983 A | | 8/1916 | Farmer |
| 2,563,548 A | * | 8/1951 | Plante .................. 210/444 |
| 2,672,984 A | | 3/1954 | Russell |
| 3,000,505 A | * | 9/1961 | Scavuzzo ............... 210/132 |
| 3,194,401 A | * | 7/1965 | Banker .................. 210/444 |
| 3,281,513 A | * | 10/1966 | Stripp et al. ............ 264/156 |
| 3,367,507 A | | 2/1968 | Hultgren |
| 3,397,518 A | * | 8/1968 | Rogers ................... 55/497 |
| 3,397,786 A | | 8/1968 | Hultgren |
| 3,506,475 A | * | 4/1970 | MacDonnell ............ 427/285 |
| 3,591,004 A | * | 7/1971 | Roosa .................... 210/94 |
| 4,418,662 A | * | 12/1983 | Engler et al. ............. 96/133 |
| 4,969,994 A | | 11/1990 | Misgen et al. |
| 5,066,391 A | * | 11/1991 | Faria ..................... 210/85 |
| 5,084,162 A | | 1/1992 | Conti |
| 5,171,430 A | * | 12/1992 | Beach et al. ............. 210/94 |
| 5,391,212 A | * | 2/1995 | Ernst et al. ............. 55/385.3 |
| 5,569,373 A | | 10/1996 | Smith et al. |
| 5,584,987 A | | 12/1996 | Mules |

(Continued)

FOREIGN PATENT DOCUMENTS

JP      2001029712      2/2001

*Primary Examiner*—John Kim
(74) *Attorney, Agent, or Firm*—Honigman Miller Schwartz & Cohn LLP (57) ABSTRACT

A three-piece filter system comprises a base, a deep pocket filtering media, and a housing shell. The base is adapted to be fitted/threaded onto an engine block, with a sealing surface to provide a seal with the engine block. The filtering media and cap member is placed pleated-media end down into the housing shell. The filtering media self centers and the housing shell with the filtering media attached is attached to the base. The unitary filtering media and cap member are formed as a replaceable component that seats into the housing shell without a center tube or other outside support. When the housing shell is threaded onto the base, the cap member is sandwiched between a ledge on the shell and a seal on the base. The filter media itself is a solid block and has no center tube. The filter media is a solid pleated pocket design affixed to the cap member. In the preferred design, the filter element is square rather than round to increase surface area. The structure of the filter media eliminates the center tube and compression spring and bottom plate typically used inside the shell of a spin-on filter assembly; thus, the number of parts is reduced and assembly is simplified.

22 Claims, 8 Drawing Sheets

U.S. PATENT DOCUMENTS

| | | | | |
|---|---|---|---|---|
| 5,795,361 | A * | 8/1998 | Lanier et al. | 55/502 |
| 5,817,232 | A | 10/1998 | Roll et al. | |
| 5,830,371 | A | 11/1998 | Smith et al. | |
| 6,068,763 | A | 5/2000 | Goddard | |
| 6,165,242 | A * | 12/2000 | Choi | 55/524 |
| 6,387,259 | B1 | 5/2002 | Roll | |
| 6,488,848 | B1 | 12/2002 | Smith | |
| 6,568,539 | B1 * | 5/2003 | Deibel et al. | 210/443 |
| 6,579,448 | B2 | 6/2003 | Dworatzek et al. | |
| 6,595,372 | B1 * | 7/2003 | Minowa et al. | 210/440 |
| 6,824,581 | B1 * | 11/2004 | Tate et al. | 55/385.3 |
| 6,911,141 | B2 | 6/2005 | Stamey, Jr. et al. | |

* cited by examiner

FLUID FILTER AND CAP MEMBER

BACKGROUND OF THE INVENTION

1. Field of the Invention

This invention relates to filters for filtering fluids such as engine oil, coolant, fuel, hydraulic or transmission fluid.

2. Description of Related Art

Fluid filters are used to remove contaminants from fluid, such as engine oil. Internal combustion engines use oil to lubricate bearings and reduce friction. This oil is circulated through the engine and carries contaminants such as metal particles, carbon particles and dirt which may cause harm to the engine. In order to effectively lubricate the engine, engine oil is passed through a filter to remove the contaminants before the oil is recirculated into the engine. The typical oil filter is attached to an internal combustion engine at the oil filter receptacle. Engine oil passes through a discharge opening in the oil filter receptacle, into a fluid filter and then into the engine lubrication system through an oil inlet pipe. A filter element in the fluid filter removes contaminates from the oil before it reenters the engine through the oil inlet pipe. Because of the dynamic nature of this process, oil filters must be sealed to protect from oil leaking into the atmosphere.

Oil filters have traditionally been of a disposable type creating a great environmental concern. Used oil filters are disposed of in landfills or by incinerating. Recent improvements in the art have separated the filter elements from the filter canister allowing users to dispose of only the filter element and thus reducing the quantity of waste material. However, a large volume of waste is still generated by disposing of the filter element.

Various engine manufacturers use different arrangements for attaching oil filters to their engine blocks. The different mount necessitates additional cost to produce and distribute oil filters. The supply of filters for various engine manufacturers involves the remanufacture of major components of an oil filter or an entire filter assembly in order to adapt a filter product to a particular engine.

There is a need for a fluid filter for filtering a variety of fluids which features a reusable filter element and which can easily be adapted to different connection configurations, especially for use in engines as oil filters.

SUMMARY OF THE INVENTION

A three-piece filtering system replaces the standard style of OE and aftermarket automotive liquid filters, whereby the filtering system provides an environmental approach with respect to recycling of the filter media portion. The three-piece filter system comprises a base, a deep pocket filtering media, and a housing shell. In the preferred embodiment, the only discardable part of the filter system is the deep pocket media.

The base is adapted to be fitted/threaded onto an engine block, with a sealing surface to provide a seal with the engine block. The filtering media and cap member is placed pleated-media end down into the housing shell. The filtering media self centers and the housing shell with the filtering media attached is sealingly affixed to the base.

The unitary filtering media and cap member are formed as a replaceable component that seats into the housing shell without a center tube or other outside support. When the housing shell is threaded onto the base, the cap member is sandwiched between a ledge on the shell and a seal on the base.

The filter media itself is a solid block and has no center tube. The filter media is a solid pleated pocket design affixed to the cap member. In the preferred design, the filter element is square rather than round to increase surface area. The structure of the filter media eliminates the center tube and compression spring and bottom plate typically used inside the shell of a spin-on filter assembly; thus, the number of parts is reduced and assembly is simplified.

An advantage of the invention is a reusable filter element which will reduce landfill volume and the number of filter elements burned in incinerators and reduce the cost of filter maintenance. Another feature of the invention is a relief valve assembly to allow fluid to continue to flow in the event the filter element becomes clogged.

Further features and advantages of the invention are pointed out with the description of the preferred embodiment, drawings and claims of this application.

BRIEF DESCRIPTION OF THE DRAWINGS

FIG. 3b is a top view of the cap member illustrated in FIG. 3a.

DETAILED DESCRIPTION OF PREFERRED EMBODIMENTS

Figure 1:
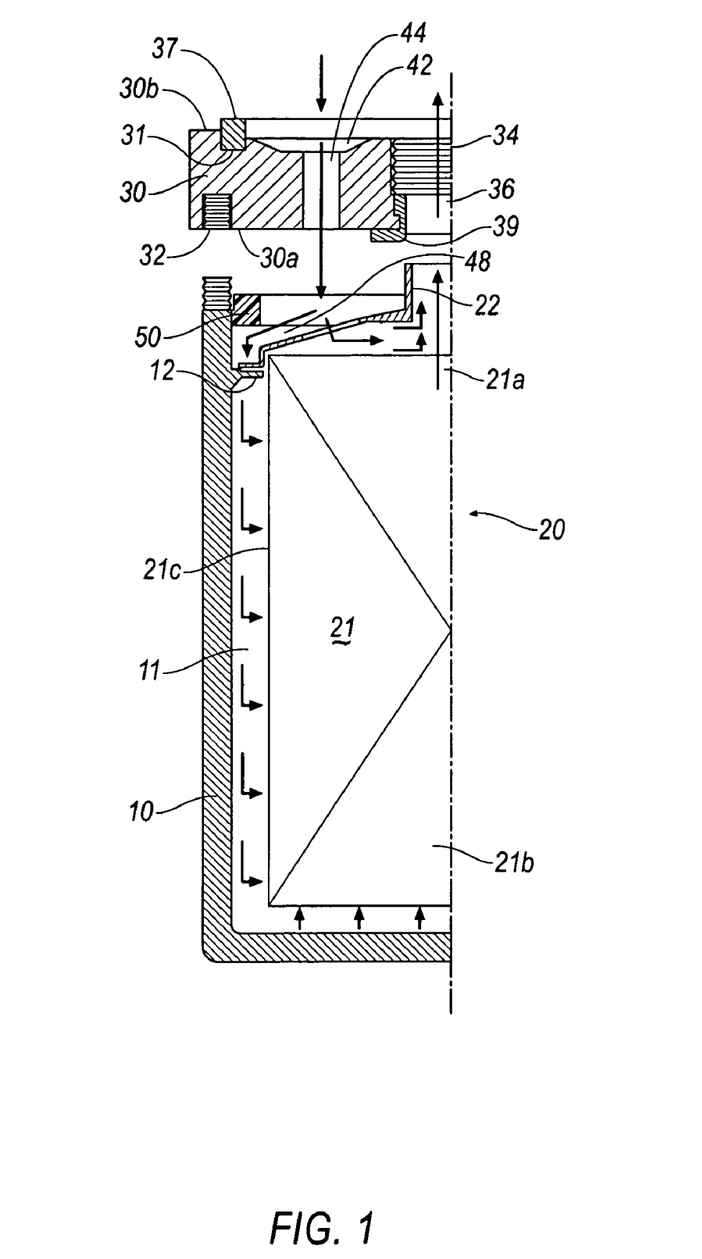
FIG. 1 is a detail section view of a reusable three-piece fluid filter including the base, the housing shell, and the filtering element.

One form of the invention is illustrated and described herein as an oil filter on an engine. FIG. 1 illustrates reusable fluid filter comprising a housing shell 10, a filter element 20, and a threaded base/adapter 30.

As illustrated in FIG. 1, the threaded base 30 has external threads 32 and internal threads 34. External threads 32 are used to threadably mount the base 30 to a standard reusable filter housing shell 10. Internal threads 34 are machined to allow the fluid filter to be adapted to a wide variety of engines produced by various manufacturers. An engine block (not shown) typically has an oil filter stub (not shown) to allow a fluid filter to be threadably attached via internal threads 34. Filtered oil port 36 is formed in base 30 to allow filtered fluid to exit the reusable fluid filter after passing through the cap member 22. Threaded base 30 is designed to be an inexpensive device to allow the reusable oil filter to be adapted to a wide variety of engine blocks. Internal threads 34 are formed to fit OEM threads of the oil filter stub (not shown) and adapts the reusable fluid filter to a wide variety of engines while reducing the costs to manufacture, package and distribute reusable fluid filters.

The base 30 has an inside face 30a and an outside face 30b. Outside face 30b has an annular flat surface and an annular channel cut 31 formed in the annular flat surface. O-ring 37 is mounted in annular channel 31 to form an oil tight seal between base 30 and the engine block when base 30 is threadably attached to filter stub. A second annular channel (not shown) in outside face 30a may also be used to form an oil tight seal with a second o-ring mounted in the second channel to adapt the base 30 to additional manufacturers engines. Unfiltered oil leaves engine block through unfiltered oil ports in the filter stub. Unfiltered fluid channel 42 is formed in outside face 30a and allows unfiltered oil to pass through unfiltered fluid inlet orifices 44, through base 30 and into the unfiltered fluid compartment 48 defined between the base 30 and the cap member 22. Unfiltered fluid channel 42 helps fluid filter 20 adapt to a wide variety of engines and other fluid systems.

Assuming normal pressure conditions and operation of the filter, the unfiltered oil passes from the compartment 48 through passageways formed at the peripheral edges of the cap member 22 and into a canister area 11 between the housing shell 10 and filter element 20 media 21 such that the fluid is permitted to pass into both the sides and the bottom of the filter media 21 as shown by the arrows of FIG. 1.

Unfiltered fluid inlet orifices 44 maybe formed at an angle to the axis of canister 10 in order to create a turbine or a swirling motion of unfiltered fluid in the unfiltered fluid compartment 48.

Filter element 20 comprises a reusable filter media 21 and cap member 22. The reusable filter media 21 comprises a cleanable element having a first end 21a, a second end 21b, and an outside cylindrical wall 21c. The first end 21a of the deep pocket filter media 21 is attached to the cap member 22. Unlike conventional filter media of conventional oil filters, the filter media 21 is a pleated pocket design similar to conventional panel air filtration systems. The filter media 21 is solid block and has no center tube and, in the preferred embodiment, the filter media 21 is square—rather than round when—view from the top to increase surface area. In a conventional round-type, media style filter for spin-on liquid filter assembly, the typical area of the filter media is $357.4\ in^2$. For the solid, square pleat block of this invention, the corresponding filter area is $410.6\ in^2$ to fit the same size housing shell. Of course, these dimensions relate to only one example of a filter size; other filter sizes achieve similar benefits. With the solid square structure of the filter media 21, the stability and rigidity of the filter media is enhanced. In other words, the spacer/comb design provides even pleat spacing under pressure while giving rigidity to the deep pocket media element 21. As a result, the solid structure of the filter media 21 eliminates the center tube as well as the compression spring and bottom plate typically used inside the shell of a spin-on filter assembly. Thus, the number of parts is reduced with the design of this invention.

In a preferred embodiment, the filter media 21 may be torn away from or otherwise removable from the cap member 22 to further enhance the environmental benefits of this invention.

The cap member 22 is preferably metallic but other suitable materials may be used without departing from this invention. For example, a plastisol material may be used to form the cap member 22 or the interface between the cap member 22 and the filter media 21.

Figure 2:
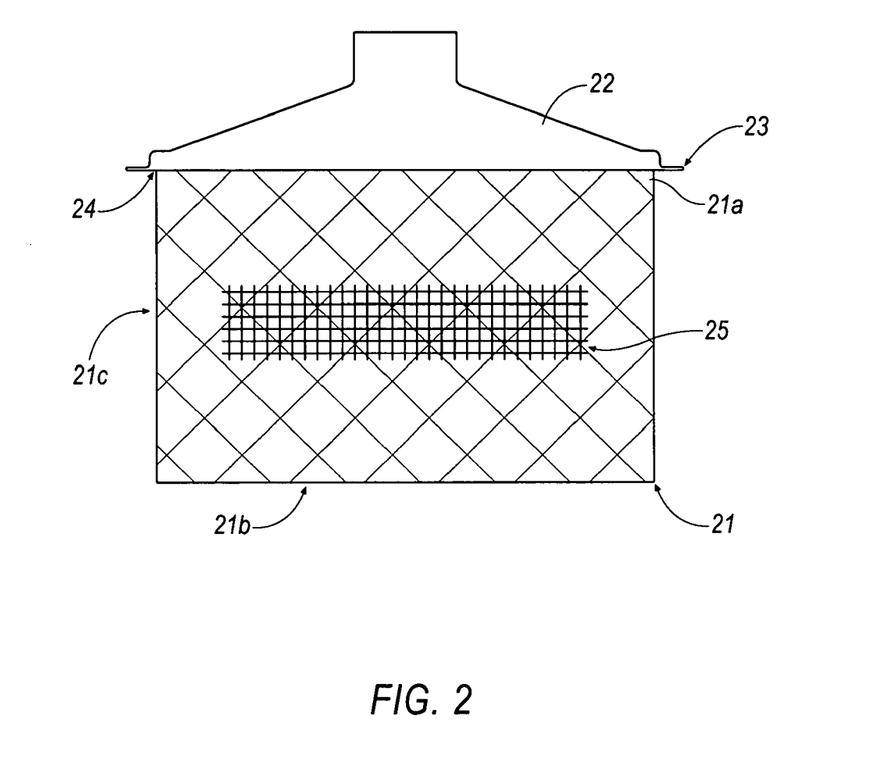
FIG. 2 is a side view of the reusable fluid filter media and associated cap member.

In one embodiment of this invention, the filter media 21 is provided with a cleanable mesh 25 (see FIG. 2), which is woven from a material such as metallic wire.

As shown in FIG. 1, the unitary filtering media 21 and cap member 22 may be formed as a replaceable assembly that seats into the housing shell 10 without a center tube or other outside support. The cap member 22 is formed with a rim portion 23 defining a mounting surface 24, which is adapted to rest on the inwardly projecting surface or ledge 12 provided on the inner surface of the housing shell 10. When the housing shell 10 is threaded onto the base 30, the cap member 22 is sandwiched between the ledge 12 on the housing shell 10 and a seal 50 adjacent the base 30. Alternately, the seal 50 may be omitted in favor of the friction force provided by the inner seal 39 disposed adjacent the filtered oil port 36, whereby the cap member 22 is sandwiched between the ledge 12 on the housing shell 10 and the inner seal 39 at the filtered oil port 36. It is within the scope of this invention to provide any type of retention system to maintain the filter media 21 and cap member 22 in fixed position within the housing shell 10 and base 30.

Figure 3A:
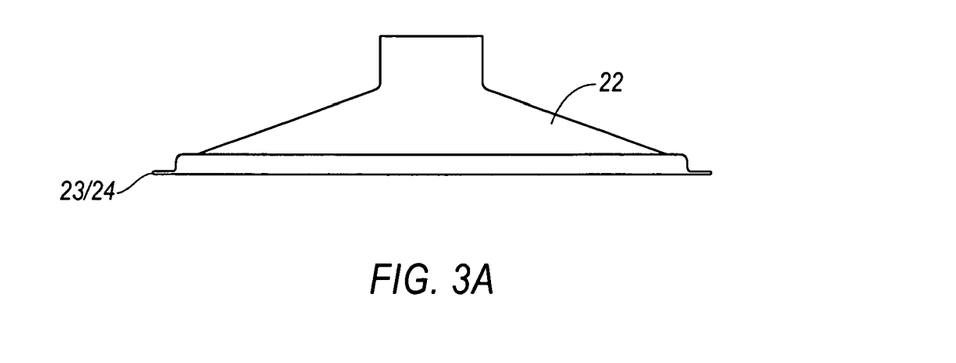
FIG. 3a is a side view of the cap member of this invention.
Figure 3B:
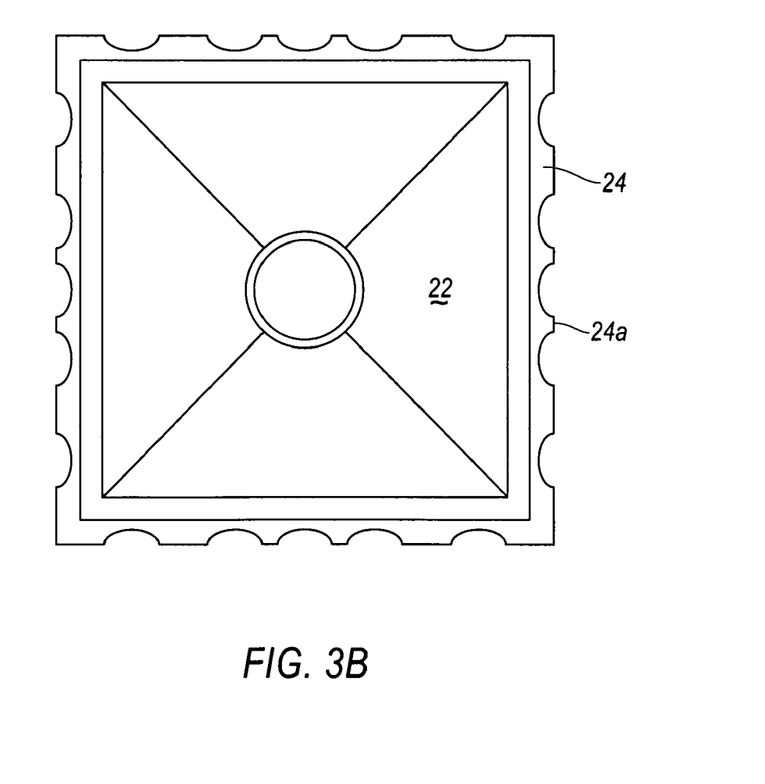

With reference to FIGS. 3a and 3b, the cap member 22 is shown with an emphasis on the shape and function of the ledge 12. As shown in FIG. 3b, the ledge 12 may be formed as a wave-shaped edge 24a to permit flow of the unfiltered oil from the unfiltered oil compartment 48 through the passageways defined by the wave-shaped edge 24a formed at the periphery of the cap member 22 and into the canister area 11 between the housing shell 10 and filter element 20. The ledge 12 is correspondingly formed to permit flow of unfiltered oil around the peripheral edge 24a of the cap member 22. Alternatively, suitable passageways may be provided at the interface of the rim 23 and ledge 12. The wave shape shown in FIG. 3b provides sufficient support for the cap member 22 and filter media 21 while permitting sufficient flow of oil from the compartment 48 to the canister area 11.

It should be understood that if filter element 12 becomes clogged with contaminants, pressure in the unfiltered fluid compartment 48 becomes very great due to oil being forced into canister area 11 through passageways at the periphery of the cap member. When this pressure differential reaches a predetermined force, pressure against valve hole 100 will overcome a mounting force of a pressure relief valve member 102 causing a direct fluid communication through valve hole 100 between unfiltered fluid compartment 48 and hollow core leading to the filter oil port 36. This arrangement will allow unfiltered fluid to flow directly from the unfiltered fluid inlet orifices 44 through the unfiltered fluid compartment 48 and into port 36 to return to engine block through filtered oil tube.

Figure 4:
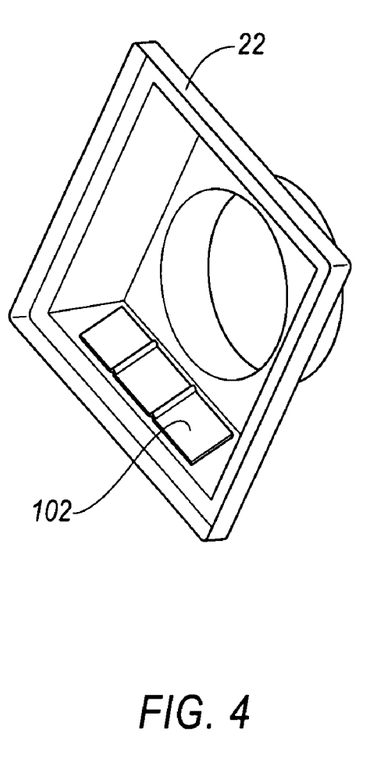
FIG. 4 is a schematic bottom view of an alternate embodiment of the cap member of FIG. 2 including a pressure relief valve.
Figure 4A:
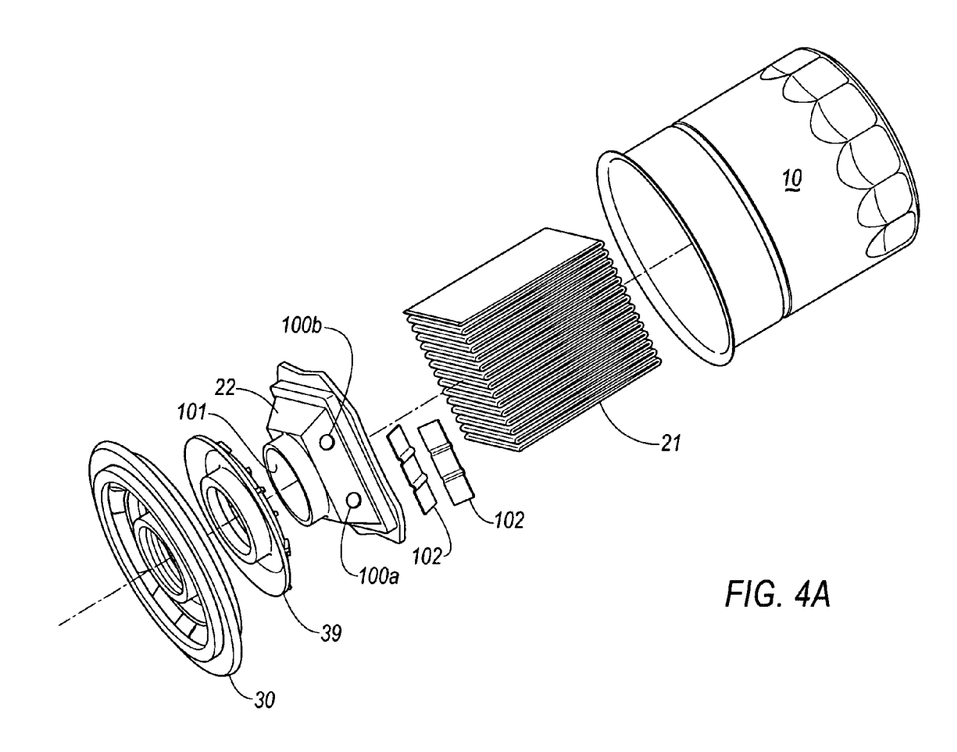
FIGS. 4a-4d show various views of the preferred design of the filter assembly according to the present invention as described above.
Figure 4B:
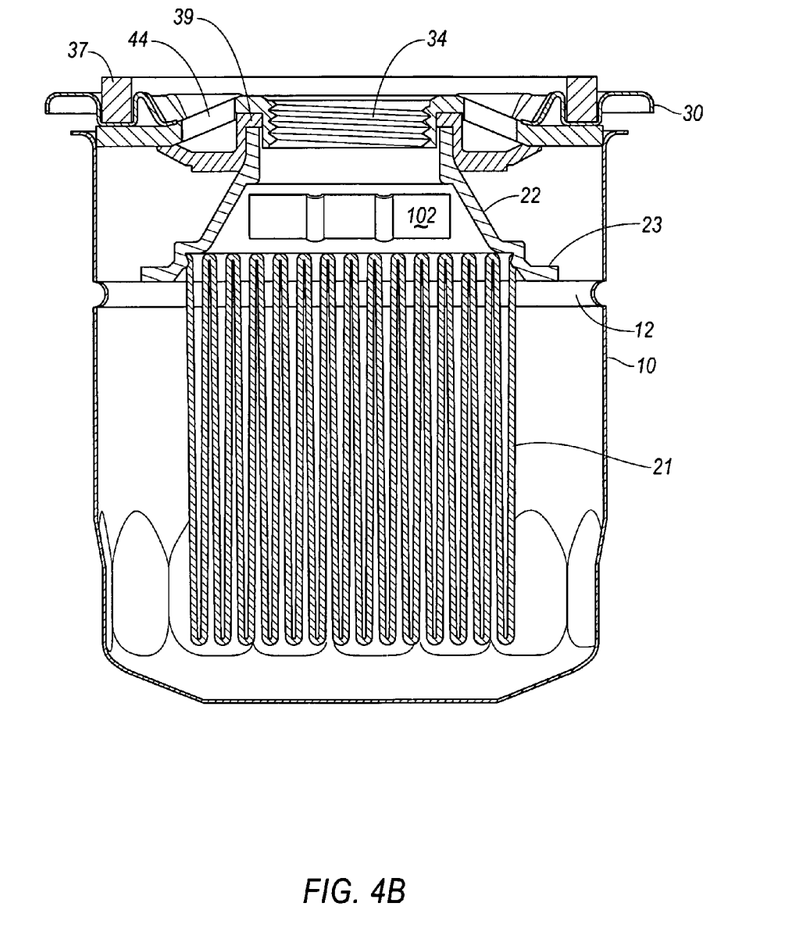
Figure 4C:
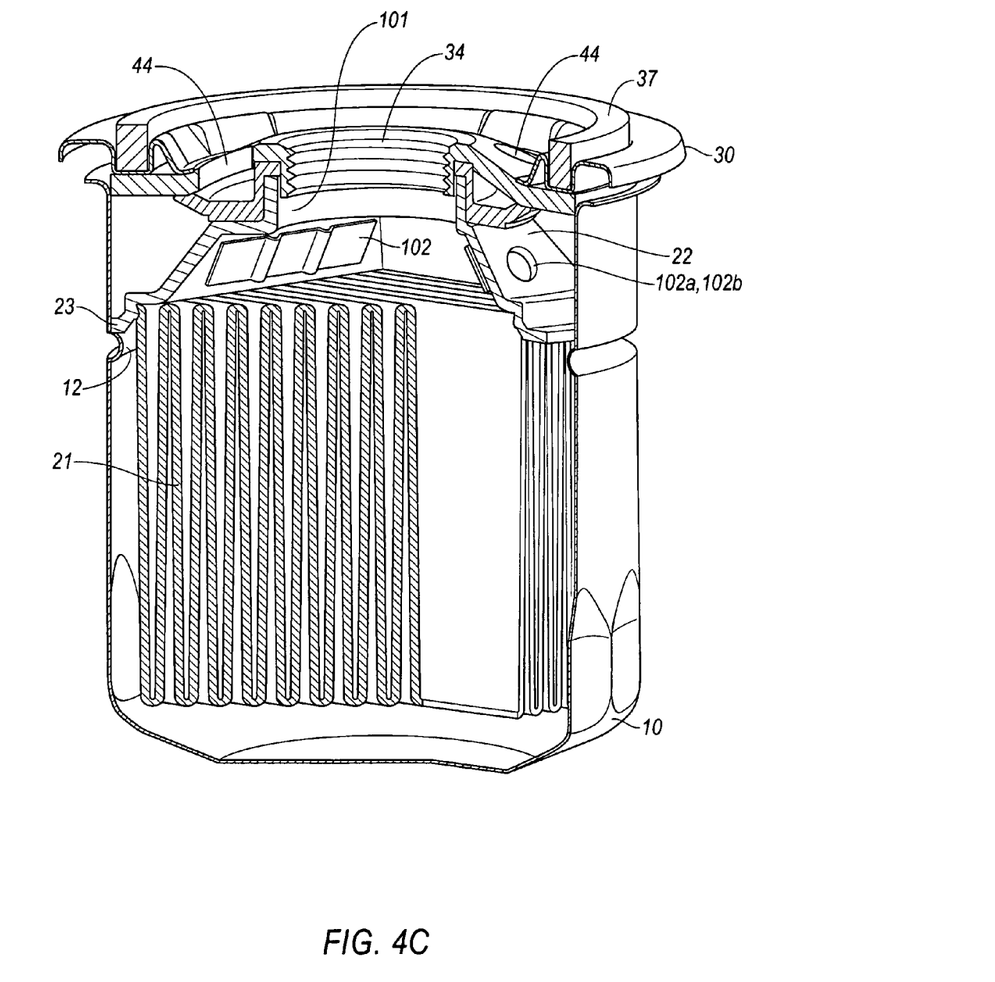
Figure 4D:
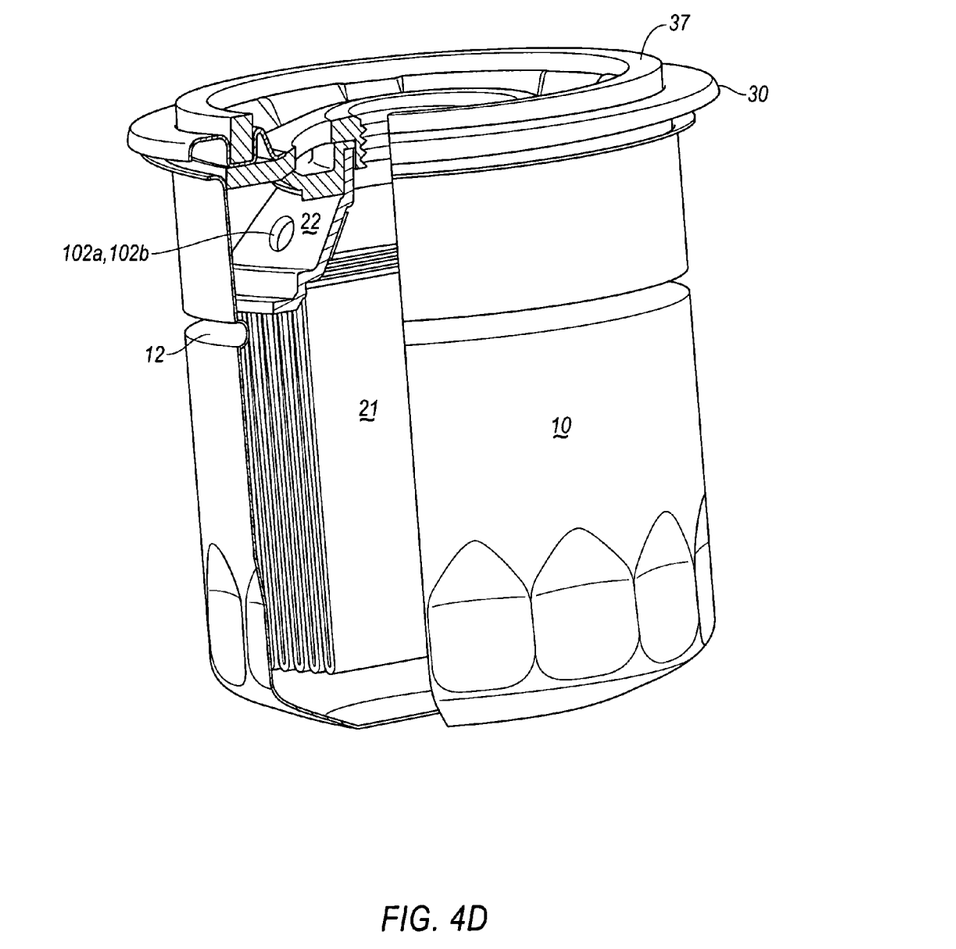

FIGS. 4a-4d show various views of the preferred design of the filter assembly according to the present invention as described above. As shown, the end cap member 22 is shown with a pair of bypass valve holes 100a, 100b and the valve plate 102. FIG. 4 illustrates the valve plate 102 as mounted on the underside of the end cap member 22.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

The invention claimed is:

1. A component of a filter assembly that is disposed in a housing shell defining a canister area, comprising:
    a cap member including an underside, wherein the cap member defines a valve hole;
    filter media affixed to the underside of the cap member, wherein the filter media is defined to be
        substantially solid,
        uniform throughout a central cross section, and
        without a central hollow portion that otherwise would permit passage of a center tube disposed inside the canister area; and
    at least one pressure relief valve disposed on the underside of cap member proximate the valve hole, wherein the at least one pressure relief valve faces the filter media, wherein the at least one pressure relief valve is disposed adjacent the underside of the cat member without being biased, urged or secured against the underside of the cap member be a biasing, urging or securing member extending toward the underside of the can member from within the canister area.

2. The component of a filter assembly according to claim 1, wherein said filter assembly is replaceable or disposable.

3. The component of a filter assembly according to claim 1, further comprising stabilization beads of adhesive attached to the filter media to maintain pleat spacing.

4. The component of a filter assembly according to claim 1, wherein said cap member is formed with a peripheral edge defining a support surface.

5. The component of a filter assembly according to claim 4, wherein said peripheral edge defines a wave-shaped edge along a periphery of the cap member.

6. The component of a filter assembly according to claim 1, wherein said filter media is substantially rectangular in cross section.

7. The component of a filter assembly according to claim 1, wherein said cap member is rectangular when viewed from top.

8. The component of a filter assembly according to claim 1, wherein said at least one pressure relief valve provides a direct fluid communication through said valve hole between an unfiltered fluid compartment upstream of said cap member and hollow core leading to a filter oil port passing through a base, whereby unfiltered fluid may flow directly from unfiltered fluid inlet orifices through the unfiltered fluid compartment and into said filtered oil port.

9. The component of a filter assembly according to claim 1, wherein said filter media is removably-attached to said cap member.

10. The component of a filter assembly according to claim 1, wherein said filter media comprises a reinforcing wire screen.

11. The component of a filter assembly according to claim 1, where said filter media is further defined to include a solid pleated pocket design.

12. The component of a filter assembly according to claim 1, where said filter media is further defined to include a series of folded sheets that overlap to form a substantially solid block.

13. A filter assembly, comprising:
a housing shell defining a filter media canister area; and
filter media disposed in the filter media canister area, wherein the filter media is defined to be
substantially solid,
uniform throughout a central cross section, and
without a central hollow portion that otherwise would permit passage of a center tube disposed inside the canister area;
a cap member including an underside surface, wherein the filter media is directly affixed to the underside surface of the cap member; and
at least one pressure relief valve disposed directly adjacent the underside surface of the cap member, wherein the at least one pressure relief valve disposed directly adjacent the underside surface of the cap member faces the filter media, wherein the at least one pressure relief valve is disposed adjacent the underside surface of the cap member without being biased, urged or secured against the underside surface of the cap member by a biasing, urging or securing member extending toward the underside surface of the cap member from within the canister area.

14. The filter assembly according to claim 13, wherein the housing shell includes an inner surface having a radially-inward projecting ledge, and, wherein the cap member includes
a radially-outward projecting rim portion that engages the radially-inward projecting ledge of the housing shell, wherein the cap member is disposed over the filter media.

15. The filter assembly according to claim 14, wherein the filter media is formed to include a block of a continuous series of pleats extending across an entire width thereof such that no substantial opening is formed in the filter media to prevent passage of a center opening or compression spring through the filter media.

16. The filter assembly according to claim 14, wherein said filter media is spaced from said inner surface and a closed bottom of said housing shell.

17. The filter assembly according to claim 13 further comprising:
a base including an unfiltered fluid channel and a filtered fluid port that is adapted to threadingly-engage the housing shell, wherein the rim portion of the cap member is sandwiched between the base and the ledge as the base threadingly-engages the housing shell.

18. The filter assembly according to claim 17, wherein the cap member includes a filtered-fluid port for passing a filtered-fluid there-through for subsequent passage through the filtered fluid port formed in the base.

19. The filter assembly according to claim 17, wherein the rim portion is formed with a wave-shaped peripheral edge that defies an unfiltered fluid passage with the inner surface of the housing shell for passing an unfiltered fluid there-through that is received from the unfiltered fluid channel formed in the base.

20. The filter assembly according to claim 17, further comprising:
a seal positioned between the base and the cap member.

21. The filter assembly according to claim 20, wherein the seal is circumferentially-disposed in the filtered fluid port formed in the base.

22. The filter assembly according to claim 20, wherein the seal is positioned between the rim portion of the cap member and an inside face of the base.

* * * * *

UNITED STATES PATENT AND TRADEMARK OFFICE
CERTIFICATE OF CORRECTION

PATENT NO.         : 7,410,575 B1
APPLICATION NO. : 10/445054
DATED                  : August 12, 2008
INVENTOR(S)       : Brian S. Crawford et al.

It is certified that error appears in the above-identified patent and that said Letters Patent is hereby corrected as shown below:

In Claim 1, column 4, line 67, please delete "cat" and insert --cap--; column 5, line 2, please delete "be" and insert --by--; column 5, line 3, please delete "can" and insert --cap--.

In Claim 7, column 5, line 20, please delete "wben" and insert --when--.

Signed and Sealed this

Twenty-first Day of October, 2008

JON W. DUDAS
*Director of the United States Patent and Trademark Office*